United States Patent
Lang

[15] 3,708,132
[45] Jan. 2, 1973

[54] METHOD AND DEVICE FOR WINDING REINFORCING THREADS FOR PRODUCING TUBULAR BODIES OF REINFORCED SYNTHETIC RESIN

[72] Inventor: Georges F. Lang, Nancy, France

[73] Assignee: Centre de Recherches de Pont-A-Mousson, Maidieres, Pont-A-Mousson, France

[22] Filed: July 28, 1969

[21] Appl. No.: 845,282

[30] Foreign Application Priority Data

July 29, 1968 France..................160934

[52] U.S. Cl. ............242/7.23, 156/180, 156/446, 242/158 B
[51] Int. Cl. ......................................B65h 81/06
[58] Field of Search..........242/7.02, 7.22, 7.21, 7.23, 242/158 B, 158 R; 156/180, 189, 172, 173, 184, 429, 446, 431; 28/37

[56] References Cited

UNITED STATES PATENTS

| 2,972,796 | 2/1961 | Block | 242/158 R X |
| 3,146,962 | 9/1964 | Hardwick | 242/7.21 X |
| 3,201,298 | 8/1965 | Baker et al. | 156/431 |
| 3,363,849 | 1/1968 | McLarty | 242/7.21 |

Primary Examiner—Billy S. Taylor
Attorney—J. Delattre-Seguy

[57] ABSTRACT

Method and device for winding parallel layers of threads or filaments on a mandrel driven in rotation for producing a tubular body of reinforced synthetic resin. The method employs a thread guide comb. The width of the layer of threads is varied by modifying the angle of orientation of the comb relative to the axis of the mandrel.

5 Claims, 9 Drawing Figures

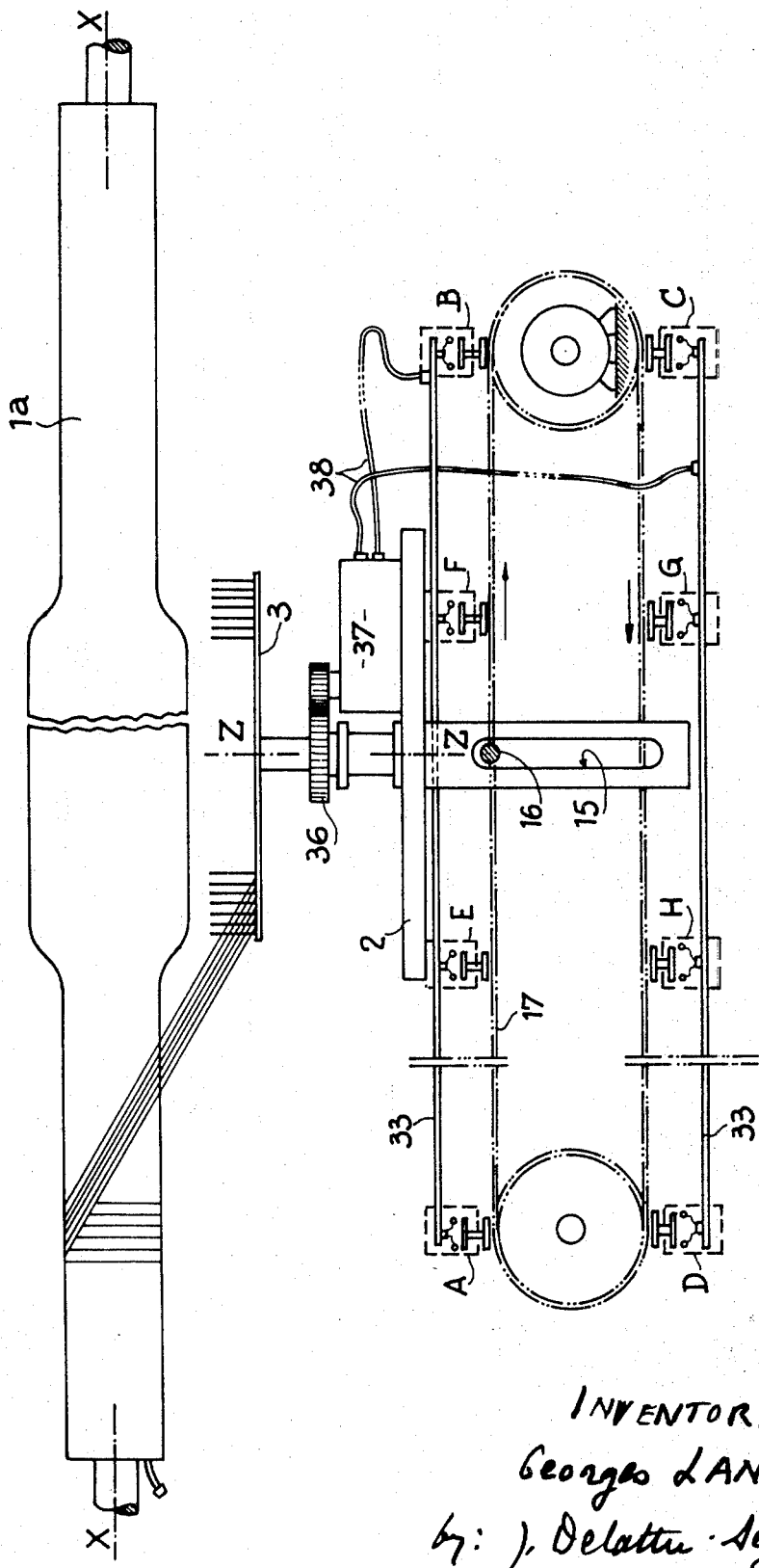

METHOD AND DEVICE FOR WINDING REINFORCING THREADS FOR PRODUCING TUBULAR BODIES OF REINFORCED SYNTHETIC RESIN

The present invention relates to the production of tubular bodies of synthetic resin reinforced with glass fibers or the like and more particularly fibers united into parallel threads or filaments constituting layers.

The production method consisting in helically winding on a mandrel, a layer or web of reinforcing threads or filaments at a predetermined winding angle relative to the winding axis, is known. The winding angle, which is or is not constant, depends on the mechanical bending strength and the resistance to internal pressure that the tubular body must have for a given use. The tubular bodies thus manufactured have excellent mechanical properties.

The known technique employs a guide comb between the teeth of which the layers are uniformly distributed. This comb is fixed so as to be parallel to the axis of the mandrel. The width $l$ of the layer thus produced is given by the formula $l = ne \sin x$, in which $x$ is the winding or laying angle, $e$ the space between two consecutive teeth of the comb and $n$ the number of intervals occupied by the threads, the number of threads being therefore equal to $n + 1$.

According to this known technique, as the winding angle $x$ depends on the required mechanical characteristics of the manufactured pipe, the width $l$ of the layer is governed by the number $n$ of intervals. Each time it is desired to modify the width of the layer of threads, for example when changing the diameter of the pipe to be manufactured, it is therefore necessary to modify the regulation of the threads, that is, their positioning on the guide comb.

In particular, the known technique does not permit of a continuous variation of the width of the layer of threads during the winding, which variation could be necessary, for example when it is desired to change the magnitude of the winding angle in the course of manufacture or when the body of the tubular body to be manufactured does not have a constant diameter.

Consequently, when employing the known device having a fixed comb, it is often necessary to carry out preliminary trial windings on prototypes so as to determine the width of the layer and the number of comb teeth to employ for a given winding, for example a winding having contiguous turns.

The object of the invention is to provide a method for winding layers of parallel reinforcement threads or filaments on a mandrel driven in rotation so as to produce tubular bodies of reinforced synthetic resin, said method being so improved as to permit of a much easier regulation of the width of the winding layer by the separate control of this width and of the number of threads contained in this layer. This method is of the type in which a thread guide comb is employed and comprises varying the width of the layer of threads or filaments by varying the orientation of the guide comb relative to the axis of the mandrel.

In this method, the width $l$ of the layer is given by the formula $l = ne \sin (x-y)$ in which $y$ is the angle of orientation of the comb relative to the winding axis.

In this method, if the winding angle $x$ is assumed to be constant, there are two parameters for modifying the width $l$ instead of a single parameter as in the known technique, namely : the parameter $n$ of the number of intervals employed, as in the known technique, and the angle $y$ of the orientation of the comb. In practice, merely the regulation of the angle of inclination $y$ of the comb relative to the axis of the mandrel could be employed and it is even possible to continuously vary this angle $y$ in the course of the movement of the carriage, that is, in the course of winding. The method according to the invention therefore enables the width of the layer to be varied in a continuous manner by controlling the angle of orientation of the comb by the position of the carriage along the mandrel, for example in the manufacture of tubular products having a diameter which varies.

In other words, if the winding angle $x$ and the number of teeth intervals of the comb occupied by the threads are assumed to be constant, the method according to the invention enables an infinite number of layer widths to be produced up to the maximum value $ne \sin x$, whereas the known method enables only a single width, equal to $ne \sin x$, to be produced.

It will be understood that when it is desired to modify the winding angle $x$ to satisfy different requirements of the mechanical characteristics of the tubular body, a corresponding change in the width of the layer is also necessary. This is easily achieved by means of the method of the invention employing an orientable comb.

Another object of the invention is to provide a device for winding parallel layers of reinforcement threads or filaments on a mandrel driven in rotation about a fixed axis by means of a thread guide comb mounted on a carriage which is movable in translation in a direction parallel to the axis of the mandrel, so as to produce tubular bodies of reinforced synthetic resin, said comb being pivotable about a pin carried by the carriage and orthogonal to the axis of the mandrel.

Further features and advantages of the invention will be apparent from the ensuing description with reference to the accompanying drawings.

In the drawings :

FIG. 9 is a diagrammatic elevational view of a modification of the device according to the invention.

Figure 1:
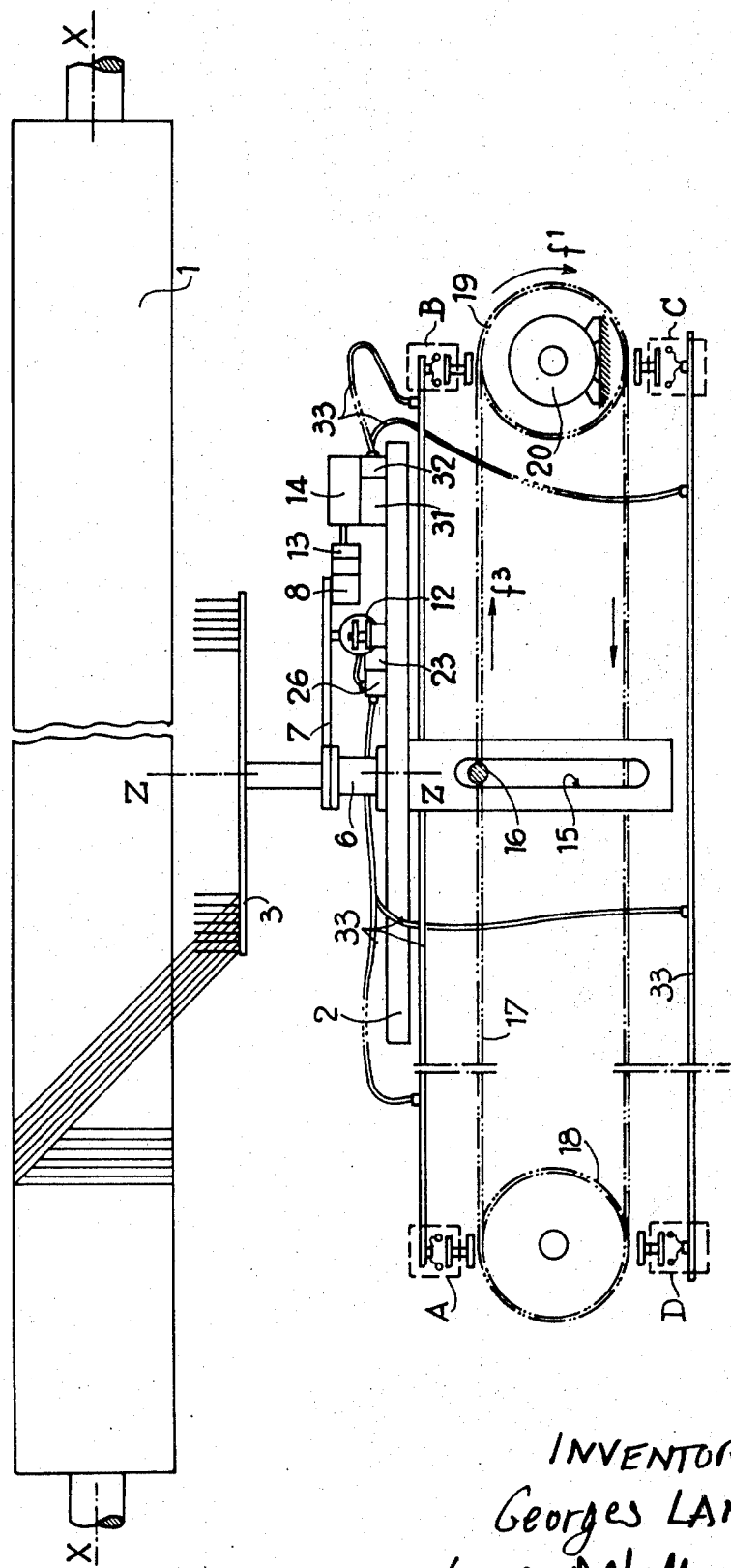
FIG. 1 is a diagrammatic elevational view of the device according to the invention.
Figure 2:
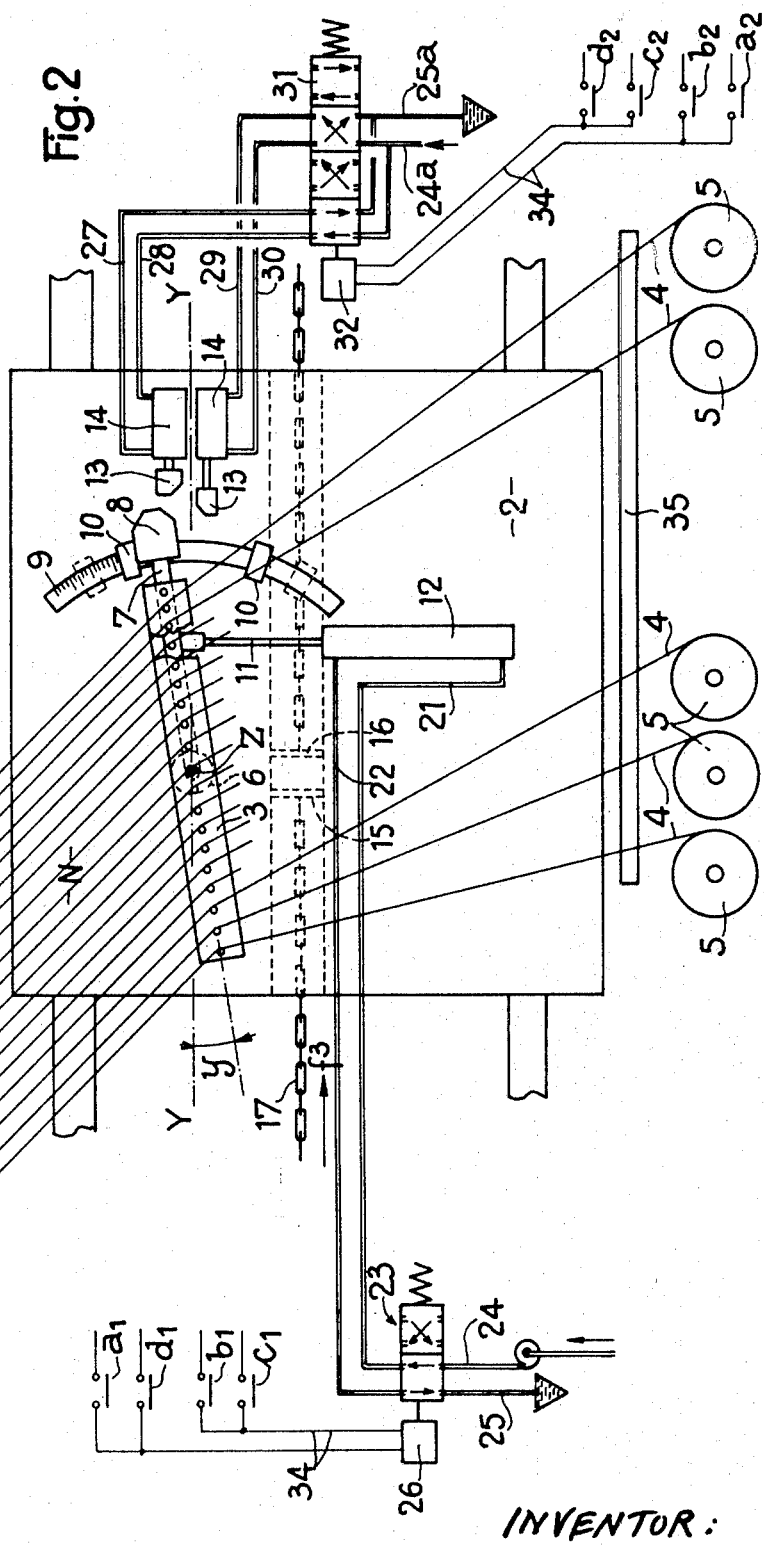
FIG. 2 is a corresponding plan view thereof.
Figure 3:
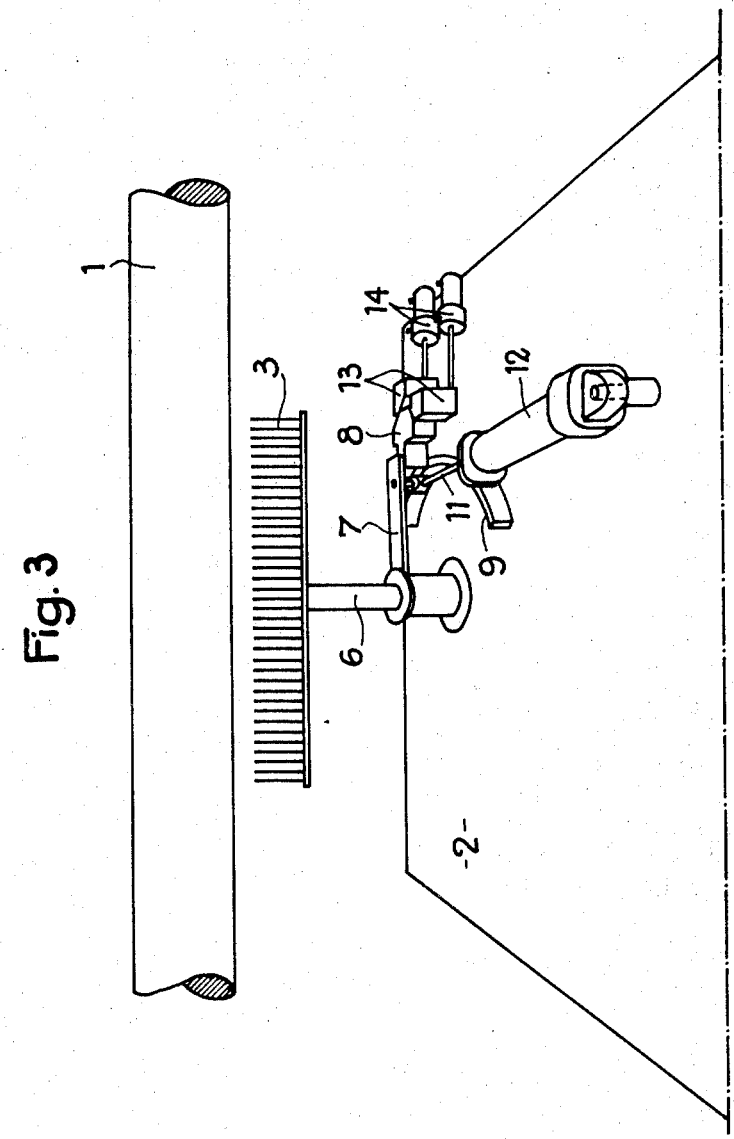
FIG. 3 is a diagrammatic perspective view of the orientable comb of the device according to the invention and of the elements which are directly combined therewith.

In the embodiment shown in FIGS. 1-3, the invention is shown applied to the production of pipes of synthetic resin reinforced with threads or filaments of glass or other material produced by filamentary windings. The device comprises a winding mandrel 1 having an axis X—X driven in rotation by a motor-reducing unit (not shown). Cooperating with this mandrel is a carriage 2 which is movable in translation in a direction parallel to the axis X—X by a drive mechanism described hereinafter. A comb 3 is mounted on the carriage 2 for guiding the threads or filaments 4 supplied by reels 5 in such manner as to wind them in parallel relation to each other on the mandrel in the form of a layer N.

According to the invention, instead of being fixed to the carriage 2 parallel to the axis X—X, the comb 3 is mounted on a pivot 6 having an axis Z—Z which is orthogonal to the axis X—X. A crank 7 is fixed to the pivot 6 in such manner as to rotate therewith in a plane parallel to the horizontal table of the carriage 2, that is, in a plane perpendicular to the axis of the pivot. The crank 7 is extended by an indexing arm 8 or index adapted to cooperate with abutments for limiting the angular movements of the crank 7 and pivot 6 and therefore of the comb 3.

Secured to the table of the carriage 2 is a graduated circular sector or protractor 9 which is concentric with the crank 7 and pivot 6. Slidable on this protractor 9 are two adjustable angular abutments 10 which cooperate with the arm 8 so as to limit the value $y$ of its angular travel, the angle $y$ having its apex on the axis of the pivot of the comb and, as its sides, the comb and a segment Y—Y parallel to the axis X—X intersecting the pivot 6, this angle being counted positively when it is located, for example as shown, adjacent the axis X—X relative to this parallel segment Y—Y and negatively when it is located on the other side of said segment.

The crank 7 is pivoted to the end of a lever constituting shifting means for pivoting the crank and comb, this lever being, in the presently-described embodiment, the rod 11 of a jack 12 mounted on the carriage 2.

The comb 3 is thus rotatable between two extreme angular positions defined by the two abutments 10 adjustable on the protractor 9.

A pair of withdrawable median abutments 13 are also provided for locking the arm 8 and the comb 3 in a mid-way position parallel to the axis X—X on the segment Y—Y. Each of these abutments 13 is separately movable by a jack 14. When an abutment 13 withdraws, it clears the path of the arm 8 and allows the comb 3 to pivot to the corresponding abutment 10.

On the other hand, when the two abutments 13 are drawn out to the maximum extent, they trap the arm 8 in the locking position on the segment Y—Y.

The devices controlling the alternating movements of the carriage 2 can be of any type. For example, they can be arranged in the following manner:

The carriage 2 is driven in translation by means of a vertical slide 15 (FIG. 1) in which is slidable a lug or pin 16 integral with an endless chain 17 held taut between two sprocket wheels 18 and 19. The center distance between these wheels, plus their diameter, corresponds to the length of the mandrel 1, that is, the travel of the carriage 2. The wheel 19 is driven in rotation in the direction of arrow $f^1$ by an electric motor-speed reducer unit 20.

The jack 12 which controls the angular movement of the comb 3 is controlled in the following manner:

The compressed fluid is supplied to this jack through conduits 21 and 22 and a slide valve 23 which is adapted to connect each of these conduits 21 and 22 alternatively either to a supply conduit 24 supplying fluid under pressure from a pump or other source or to a discharge conduit 25. The valve 23 is symbolically represented by the two positions that its slide can occupy, each position corresponding to the supplying of fluid under pressure to one of the conduits and to the connection to the discharge of the other conduit. This valve is actuated by an electromagnet 26 controlled by relay contacts $a_1, b_1, c_1, d_1$ described hereinafter.

The pairs of contacts $a_1, b_2; b_1, b_2; c_1, c_2$ and $d_1, d_2$ pertaining to the electromagnetically operated valve 23 or 31 are the contacts of electromagnetic relays whose windings (each of which windings are common to the two contacts $a_1, a_2$ or $b_1, b_2...$) are themselves supplied with voltage through contacts A, B, C, D located in the vicinity of the ends of the upper and lower chain spans of the endless chain 17 at diametrally opposed points relative to the sprocket wheels 18, 19. The electric contacts A, B, C, D are connected through electric contacts 33 to the windings of the relays controlling the contacts $a_1, a_2, b_1, b_2...$ which control the closure of the circuits 34 of the electromagnets 26, 32. The contacts A, B, C, D are, in the presently-described embodiment, assumed to be normally open and are closed upon the passage of a contact stud or roller which moves with the carriage 2. In the presently-described embodiment, they are actuated by the pin 16. When they are supplied with current, the relays serve to maintain the corresponding contacts $a_1, a_2$ or $b_1, b_2...$ closed until a maintenance circuit (not shown) is opened by the closure of the following contact by the pin 16, in the known manner.

Thus the contact A closed by the pin 16 results in the closure of the contacts $a_1, a_2$. The latters are maintained in the closed position by a maintenance circuit (not shown) when the contact A is once more opened after the passage of the pin 16. The maintenance circuit is opened by the closure of the following contact B by the pin. The closure of the contact B also has for effect to close the corresponding contacts $b_1, b_2$, which are maintained closed until the following contact C is in turn closed and so on.

The following table I gives the orientation of the comb 3 after each contact A, B, C, D has been closed. It is understood that the electromagnets 26 and 32 remain supplied with current through the relays and maintenance circuits (not shown) after the passage of the pin 16 over one of the contacts A, B, C, D to the following contact. In the boxes pertaining to the conduits 21, 22, 27, 28, 29 and 30, the + sign indicates that the conduit is supplied with fluid under pressure, the − sign indicates that the conduit is connected to the discharge.

TABLE I

| Contact closed | 21 | 22 | 27 | 28 | 29 | 30 | Angle of the comb |
|---|---|---|---|---|---|---|---|
| A | + | − | + | − | − | + | +y |
| B | − | + |   |   |   |   | 0 |
| C | − | + | − | + | + | − | −y |
| D | + | − |   |   |   |   | 0 |

The device operates in the following manner:

Assuming that a layer N of threads or filaments 4 coated with synthetic resin are to be wound onto a mandrel 1 for producing a pipe of reinforced plastics material. The synthetic resin for impregnating the threads 4 of the layer N is supplied by means of any known type, for example a trough or channel 35 (FIG. 2) or brushes.

Figure 4:
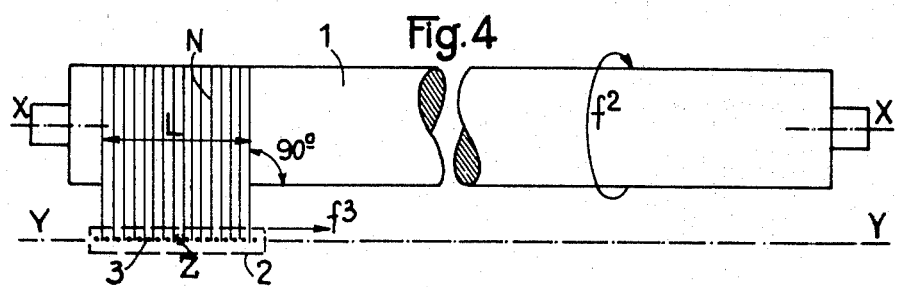
FIGS. 4-8 are diagrammatic views illustrating the various stages of the winding procedure, the comb being shown in plan.

At the start (FIG. 4), the comb 3 is oriented to be parallel to the axis X—X and the threads 4 introduced between the teeth of this comb form a layer N having a width L which is disposed at 90° to the axis X—X. The ends of the threads of this layer are, for example, stuck to the mandrel 1. This mandrel is driven in rotation in the direction of arrow $f^2$, while the carriage 2 is stationary. Thus, an orthogonal winding of several layers of the width L, is obtained.

Figure 5:
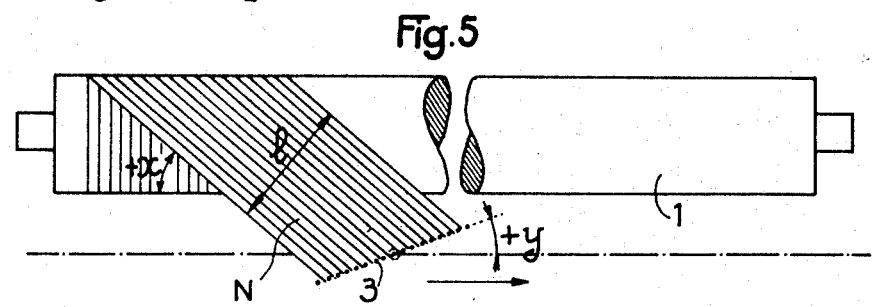

As soon as the carriage 2 is moved in translation in the direction of the arrow $f^3$, the abutment 13 which is on the side of axis X—X with respect to the segment Y—Y is withdrawn and clears the index 8. The comb 3 turns through an angle +y by the actuating of the jack 12 (FIGS. 2 and 5) and the index 8 abuts against the abutment 10 mounted on the side of the axis X—X (FIG. 2). As movement in translation of carriage 2 proceeds and due to the flexibility of the threads 4, the layer N will be inclined in a spiral line with an angle $x$ with respect to the axis X—X and winding proceeds along the mandrel 1 with this inclination and a width l which is less than L. It is to be noted that, while the winding angle $x$ of the layer N on the mandrel 1 depends only on the relation of the rotation speed of the mandrel 1 and the speed of movement in translation of the carriage 2, the width l of the layer employing all the teeth of the comb 3, is only a function of the inclination angle $y$ of the comb 3 with respect to the axis of the mandrel (FIG. 5).

Figure 6:
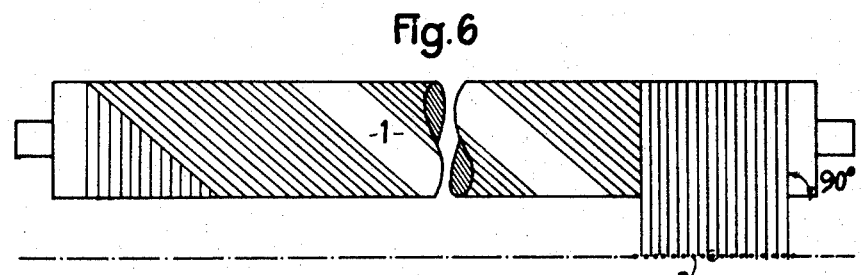

When the carriage 2 arrives at the other end of the mandrel 1, the jack 12 resets the comb 3 in its position parallel to the axis X—X (FIG. 6) and the abutments 13 lock the index 8 in this position according to the segment Y—Y. After the stopping of the carriage 2 and after some rotation of the mandrel 1, an orthogonal winding of the layer N (FIG. 6) is obtained.

In order to realize another layer of winding over the first one with an inclination angle $x$, the comb 3 is turned in the other direction over the angle $-y$ (FIG. 7) by the jack 12. At the same time, the carriage is moved in the direction of the arrow $f^4$; the relations between the rotation speed of the mandrel 1 and the translation speed of the carriage 2 being equal in both directions of movement along the mandrel 1, the inclination angle of layer N with respect to the winding axis X—X is equal in both directions, but of opposed sign ($-x$).

Figure 7:
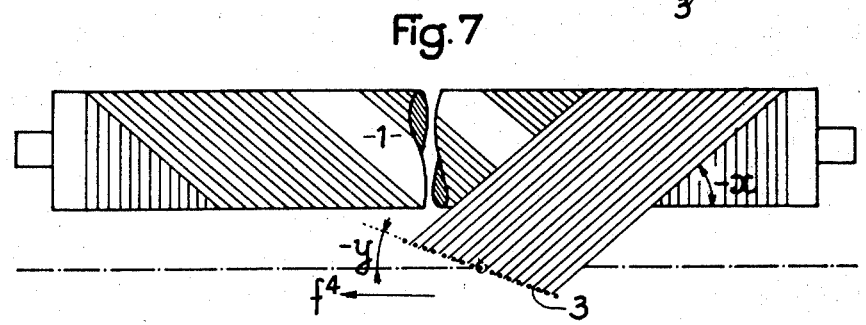

In moving the carriage in the direction of the arrow $f^4$, a second layer N is wound in a spiral line on the mandrel 1 and intersects the first layer (FIG. 7).

At the end of the course of the carriage 2 in the direction of the arrow $f^4$, the comb 3 is returned in the angular position parallel to the axis X—X and the index 8 is blocked by means of the abutments 13 in that position, after withdrawal of one of the abutments 13 which positions the index 8 in an appropriated manner, this abutment 13 being extended in order to block the index 8.

Figure 8:
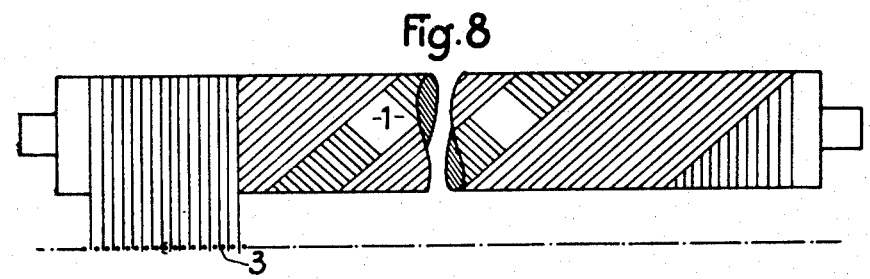

While the mandrel continues to rotate the carriage 2 stops, whereby the winding arrives at the end of the mandrel, the further layer being directed at an angle of 90° with respect to the axis X—X (FIG. 8). After rotation of the mandrel, the carriage is again moved in translation in the direction of the arrow $f^3$ and simultaneously, the comb is returned in its position of FIG. 5.

The main advantages of the device are the following:

Owing to the pivoting of the comb 3, it is possible to regulate the width l of the layers of threads by a simple adjustment of the abutments 10 which determine the angle of orientation $y$ of the comb but still employ the same number of threads and the same number of teeth of the comb, that is, preferably all the teeth of the comb. Depending on the angle $y$ of orientation of the comb 3 relative to the axis X—X, the width l of the layer is reduced and its thickness increased or its width increased by spreading the layer while its thickness is decreased. However, it is also possible to vary a second factor, namely that of the number of threads employed in a given layer and consequently employ all or only some of the teeth of the comb. But it will be understood that it is the adjustment of the orientation of the comb which is the easiest and quickest for modifying the width of the layer of threads.

Note moreover that the ends of the pipes produced with the orientable comb according to the invention, all of the teeth of which can be used, do not have large excess thicknesses of threads since the layer of winding at 90° is at maximum width L corresponding to the entire length of the comb. The layer of winding is thus spread out and thin. On the other hand, if the same work is to be carried out with a fixed comb having the same length as the orientable comb, it is necessary to adjust the width of the layer to be wound at the same angle $x$ as before in employing an appropriate number of comb teeth intervals or gaps and consequently not employ all the teeth of this comb. Consequently, the end windings at 90° have a maximum width less than that obtained with an orientable comb since it is less than the length of the comb. Thus, with a fixed comb, the end windings have greater thicknesses than with an orientable comb pertaining to the same number of threads.

When the width of the layer must vary in a continuous manner in the course of the winding operation, either because the diameter of the tubular body to be produced varies continuously or because the winding angle varies continuously, the orientation of the comb 3 can also vary continuously, for example, owing to a device controlled by the travel of the carriage carrying the comb.

In this case (FIG. 9), the pivot of the comb 3 can be integral for example with a gear wheel 36 which is driven in rotation in either direction by a commercially available suitable control device 37, of known type. This device 37 is connected by electric conductors 38 to relay contacts A, B, C, D,E,F,G,H arranged at various points of the travel of the carriage where the orientation of the comb 3 must be varied.

This modification is applicable to the manufacture of non-cylindrical bodies of revolution having a varying section. In this case, the winding mandrel $1^a$ can be, for example, inflatable and deflatable for stripping the body formed.

Cams can also be used in the control of the orientation of the comb by the movement of the carriage.

The arm or index 8 can have a round or spherical shape.

The two withdrawable abutments 13 and their corresponding jacks 14 can be replaced by a single abutment, for example, having a V shape which is also withdrawable by means of a single jack.

Having now described my invention what I claim and desire to secure by Letters Patent is:

1. A method for winding a layer of parallel reinforcement threads or filaments from thread or filament supply means onto a mandrel driven in rotation about an axis for producing a tubular body of reinforced synthetic resin, said layer having a longitudinal axis at a winding angle to said mandrel axis, comprising guiding said threads or filaments by a thread guide comb, reciprocating said guide comb in a direction parallel to said mandrel axis and varying the width of said layer of threads or filaments independently of said winding angle by modifying the angle of orientation of said comb relative to said axis of said layer, said layer being laid at maximum width at ends of said tubular body by winding said layer at an angle of 90° relative to the axis of rotation of said mandrel and disposing said comb at 90° to said layer axis, and decreasing the width of said winding layer between said ends by inclining said comb relative to said layer axis at an angle other than 90°.

2. In a device for winding a layer of parallel threads or filaments on a mandrel, means for driving said mandrel in rotation about a fixed axis, thread or filament supply means, a guide comb for said threads or filaments, said layer between said mandrel and said comb having a longitudinal axis at a winding angle to said mandrel axis, a carriage combined with means for reciprocating said carriage in a direction parallel to said mandrel axis, said comb being mounted on said carriage to be pivotable about a pivot axis orthogonal to said axis of said mandrel between a first extreme position and a second extreme position which are on each side of a mid-way position in which said comb is parallel to said axis of said mandrel, a crank connected to said comb to pivot with said comb about said pivot axis, an arm integral with said crank, two adjustable angular travel limiting abutments for said arm defining said first and second extreme positions of said guide comb, locking means co-operative with said arm for maintaining said arm in a position in which said guide comb is in said mid-way position and means for rendering said locking means selectively operative and inoperative in synchronism with reciprocation of said carriage, and shifting means combined with said crank for pivoting said comb between said mid--way position and said first extreme position in one direction of reciprocation of said carriage and between said mid-way position and said second extreme position in an opposite direction of reciprocation of said carriage in synchronism with said reciprocation of said carriage.

3. A device as claimed in claim 2, wherein said locking means is withdrawable.

4. A device as claimed in claim 2, wherein said locking means comprises a pair of withdrawable abutments and jacks operatively connected to said abutments, said pair of abutments being capable of trapping said arm of said crank and said jacks being operative in synchronism with reciprocation of said carriage.

5. A device as claimed in claim 3, wherein said withdrawable locking means comprises a single V-shaped abutment.

* * * * *